(12) United States Patent
Miyata

(10) Patent No.: US 8,255,935 B2
(45) Date of Patent: Aug. 28, 2012

(54) SLOT-IN TYPE DISK APPARATUS IN WHICH A DISK IS DIRECTLY OPERATED BY A LEVER

(75) Inventor: Koji Miyata, Ehime (JP)

(73) Assignee: Panasonic Corporation, Osaka (JP)

( * ) Notice: Subject to any disclaimer, the term of this patent is extended or adjusted under 35 U.S.C. 154(b) by 870 days.

(21) Appl. No.: 12/159,984

(22) PCT Filed: Nov. 13, 2006

(86) PCT No.: PCT/JP2006/322566
§ 371 (c)(1),
(2), (4) Date: Feb. 11, 2009

(87) PCT Pub. No.: WO2007/077677
PCT Pub. Date: Jul. 12, 2007

(65) Prior Publication Data
US 2009/0282427 A1    Nov. 12, 2009

(30) Foreign Application Priority Data

Jan. 4, 2006   (JP) ................................ 2006-000178

(51) Int. Cl.
*G11B 17/04* (2006.01)
(52) U.S. Cl. ...................................................... 720/623
(58) Field of Classification Search .................. 720/600, 720/601, 617–626
See application file for complete search history.

(56) References Cited

U.S. PATENT DOCUMENTS 6,192,019 B1   2/2001   Kurokawa
2004/0223420 A1   11/2004   Yokata
2005/0039200 A1*   2/2005   Fujimura ...................... 720/622
(Continued)

FOREIGN PATENT DOCUMENTS

JP   11-162065   6/1999
(Continued)

OTHER PUBLICATIONS

Japanese Office Action dated Mar. 10, 2009 with English translation.

(Continued)

*Primary Examiner* — Nathan Danielsen
(74) *Attorney, Agent, or Firm* — Dickinson Wright PLLC

(57) ABSTRACT

It is an object of the present invention to provide a slot-in type disk apparatus which can be reduced in thickness by precisely guiding a moving position of a disk when the disk is inserted and discharged. The slot-in type disk apparatus in which a base body 10 and a lid constitute a chassis sheath, a disk-insertion opening 11 into which a disk is directly inserted is formed in a front surface of the chassis sheath, a traverse base 30 is disposed on the side of a front surface of the base body 10, a spindle motor held by the traverse base 30 is disposed at a central portion of the base body 10, the traverse base 30 is provided with a traverse base cover 30A, a discharge lever 100 can move in a portion on the traverse base cover 30A, and a movable-side end of the discharge lever 100 is provided with a guide which holds a disk, and a height of the discharge lever 100 with respect to the traverse base cover 30A is set by contact between the discharge lever 100 and the turntable 31B.

4 Claims, 5 Drawing Sheets

U.S. PATENT DOCUMENTS

| | | |
|---|---|---|
| 2007/0186221 A1* | 8/2007 | Kirihara et al. ............... 720/620 |
| 2007/0297297 A1 | 12/2007 | Wada |
| 2008/0148301 A1 | 6/2008 | Masaoka |

FOREIGN PATENT DOCUMENTS

| | | |
|---|---|---|
| JP | 2002-352498 | 12/2002 |
| JP | 2003-109273 | 4/2003 |
| JP | 2004-39193 | 2/2004 |
| JP | 2004-310813 | 11/2004 |
| JP | 2005-85451 | 3/2005 |
| JP | 2005-302188 | 10/2005 |
| JP | 2005-327431 | 11/2005 |
| JP | 2006-134525 | 5/2006 |
| WO | 2006/067932 | 6/2006 |

OTHER PUBLICATIONS

International Search Report dated Dec. 26, 2006.

* cited by examiner

SLOT-IN TYPE DISK APPARATUS IN WHICH A DISK IS DIRECTLY OPERATED BY A LEVER

TECHNICAL FIELD

The present invention relates to a disk apparatus for recording or replaying into or from a disk-like recording medium such as a CD and a DVD, and more particularly, to a slot-in type disk apparatus into which and from which a disk can directly be inserted or discharged.

BACKGROUND TECHNIQUE

According to a conventional disk apparatus, there is widely employed a loading system in which a disk is placed on a tray or a turntable, and the tray or the turntable is loaded into an apparatus body. According to such a loading system, since the tray or the turntable is required, there is a limit to reduce the thickness of the disk apparatus body. Therefore, there recently exists a slot-in type disk apparatus in which a disk is directly operated by a lever or the like using a loading motor (e.g., patent document 1).
[Patent Document 1] Japanese Patent Application Laid-open No. 2002-352498

DISCLOSURE OF THE INVENTION

Problem to be Solved by the Invention

However, even according to a slot-in type disk apparatus in which a disk is directly operated by a lever or the like, in order to thin the apparatus, the disk must appropriately be guided so that the disk does not come into contact with a center hub of a spindle motor when the disk is inserted or discharged.

Hence, it is an object of the present invention to provide a slot-in type disk apparatus capable of reducing the apparatus in thickness by precisely guiding a moving position of a disk when the disk is inserted or discharged.

Means for Solving the Problem

A first aspect of the present invention provides a slot-in type disk apparatus in which a base body and a lid constitute a chassis sheath, a disk-insertion opening into which a disk is directly inserted is formed in a front surface of the chassis sheath, a traverse base is disposed on the side of a front surface of the base body, a spindle motor held by the traverse base is disposed at a central portion of the base body, the spindle motor is provided with a center hub to which a disk is attached and a turntable, the traverse base is provided with a traverse base cover, a discharge lever can move in a portion on the traverse base cover, and a movable-side end of the discharge lever is provided with a guide which holds a disk, wherein a height of the discharge lever with respect to the traverse base cover is set by contact between the discharge lever and the turntable.

According to a second aspect of the invention, in the slot-in type disk apparatus of the first aspect, an eject lever guide roller is provided on the movable-side end of the discharge lever, and the eject lever guide roller slides on a surface of the turntable.

According to a third aspect of the invention, in the slot-in type disk apparatus of the second aspect, the eject lever guide roller is turnably provided on an eject guide holder by an eject guide shaft.

According to a fourth aspect of the invention, in the slot-in type disk apparatus of the second aspect, a disk rubber is pasted on an upper surface of an outer periphery of the turntable, and the eject lever guide roller slides on a surface of the disk rubber.

Effect of the Invention

According to the present invention, since the height of the discharge lever can be set by contact between the discharge lever and the turntable, it is possible to precisely secure a gap between the center hub with which a disk is most prone to come into contact, and the apparatus can be reduced in thickness.

EXPLANATION OF SYMBOLS 10 base body
11 disk-insertion opening
30A traverse base cover
31 spindle motor
31A center hub
31B turntable
31C disk rubber
100 discharge lever
100A eject lever guide roller

BEST MODE FOR CARRYING OUT THE INVENTION

According to the slot-in type disk apparatus of the first aspect of the invention, the height of the discharge lever with respect to the traverse base cover is set by contact between the discharge lever and the turntable. With this aspect, since the height of the discharge lever can be set by the contact between the discharge lever and the turntable, it is possible to precisely secure a gap from the inserted disk and the center hub with which the disk is most prone to come into contact.

According to the second embodiment, in the slot-in type disk apparatus of the first aspect, an eject lever guide roller is provided on the movable-side end of the discharge lever, and the eject lever guide roller slides on a surface of the turntable. With this aspect, since the height of the discharge lever can be set by the contact between the eject lever guide roller and the turntable, it is possible to precisely secure a gap from the disk and the center hub.

According to the third embodiment, in the slot-in type disk apparatus of the second aspect, the eject lever guide roller is turnably provided on an eject guide holder by an eject guide shaft. With this aspect, since the eject lever guide roller can turn, the turntable surface is not damaged.

According to the fourth embodiment, in the slot-in type disk apparatus of the second aspect, a disk rubber is pasted on an upper surface of an outer periphery of the turntable, and the eject lever guide roller slides on a surface of the disk rubber. With this aspect, since the eject lever guide roller slides on the surface of the disk rubber, the turntable surface is not damaged.

[Embodiment]

A disk apparatus according to an embodiment of the present invention will be explained.

Figure 1:
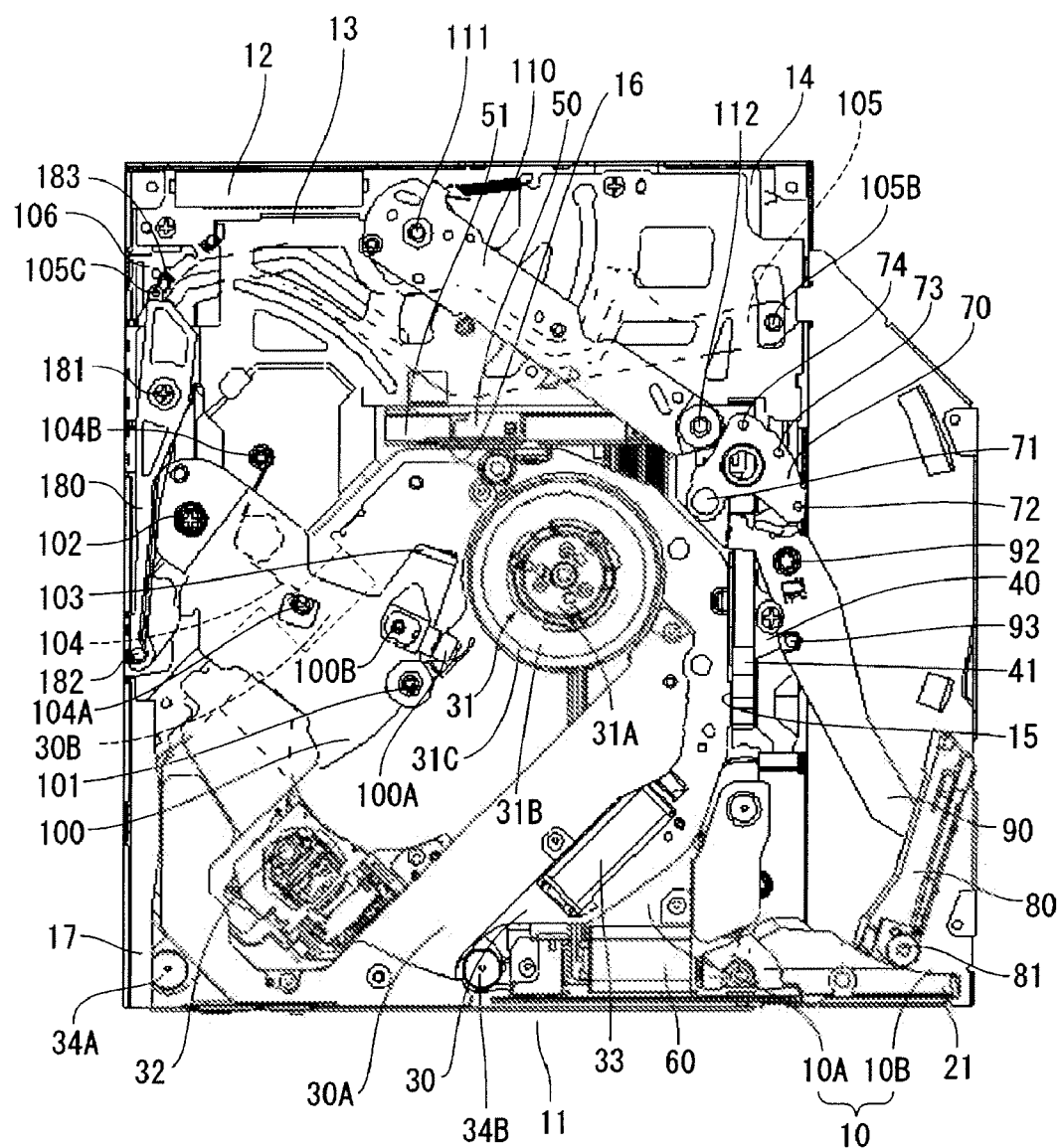
FIG. 1 is a plan view of a base body of a disk apparatus according to an embodiment of the present invention.
Figure 2:
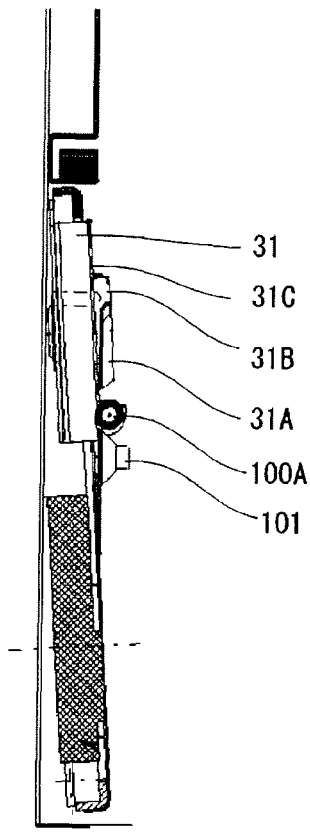
FIG. 2 is a sectional view of an essential portion of the disk apparatus.
Figure 3:
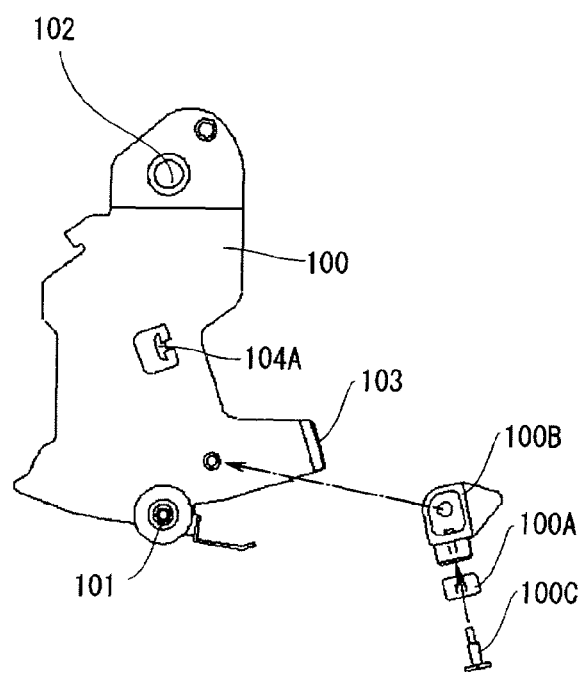
FIG. 3 is an exploded plan view of a discharge lever of the apparatus.

FIG. 1 is a plan view of a base body of a disk apparatus according to an embodiment of the invention. FIG. 2 is a sectional view of an essential portion of the disk apparatus. FIG. 3 is an exploded plan view of a discharge lever of the apparatus.

According to the disk apparatus of the embodiment, a base body and lid constitute a chassis sheath, and a bezel is attached to a front surface of the chassis sheath. The disk apparatus of the embodiment is a slot-in type disk apparatus in which a disk is directly inserted from a disk-insertion opening formed in the bezel.

As shown in FIG. 1, parts which realize the recording and replaying function onto or from a disk and a loading function of a disk are attached to the base body 10.

The base body 10 is formed with a deep bottom 10A and a shallow bottom 10B. A wing portion extending from a front surface to a rear surface is formed by the shallow bottom 10B.

The base body 10 is formed at its front side with a disk-insertion opening 11 into which a disk is directly inserted, and a connector 12 is disposed on an end of a rear surface of the base body 10. A traverse base 30 is disposed on the base body 10 on the side of the disk-insertion opening 11, and a rear base 13 is disposed on the base body 10 on the side of the connector 12. The traverse base 30 and the rear base 13 are disposed such that they are not superposed on each other. A printed board 14 is provided on the rear base 13 on the side of the surface of the base body 10.

The traverse base 30 holds a spindle motor 31, a pickup 32 and driving means 33 which moves the pickup 32. The spindle motor 31 is provided on the one end side of the traverse base 30, and the pickup 32 is provided such that the pickup 32 can move from one end to the other end of the traverse base 30. When the pickup 32 is stopped, the pickup 32 is disposed on the other end side of the traverse base 30, I.E., on the side of an outer periphery of the base body 10.

In the traverse base 30, the spindle motor 31 is located at a central portion of the base body 10, a reciprocating range of the pickup 32 is located closer to the disk-insertion opening 11 than the spindle motor 31, and the reciprocating direction of the pickup 32 is different from the insertion direction of the disk. Here, an angle of 35° to 55° is formed between the reciprocating direction of the pickup 32 and the insertion direction of a disk.

The traverse base 30 is supported on the base body 10 by a pair of insulators 34A and 34B. A traverse base cover 30A is provided on the traverse base 30 on the side of the lid. The traverse base cover 30A is formed at its portion with an opening 30B.

The pair of insulators 34A and 34B are disposed closer to a stationary position of the pickup 32 than the position of the spindle motor 31. In this embodiment, the insulator 34A is provided on the side of one end near the inner side of the disk-insertion opening 11, and the insulator 34B is provided at a central portion near the inner side of the disk-insertion opening 11. The insulators 34A and 34B includes damper mechanisms made of elastic material. The traverse base 30 brings the spindle motor 31 toward the base body 10 and away from the base body 10 around the insulators 34A and 34B as fulcrums.

The spindle motor 31 is provided at its central portion with a center hub 31A to which a disk is attached. An outer periphery of the center hub 31A constitutes a turntable 31B. A disk rubber 31C is pasted on an upper surface of an outer periphery of the turntable 31B.

A main slider 40 and a sub-slider 50 and a sub-slider 50 having cam mechanisms will be explained below. The cam mechanisms which displace the traverse base 30 are respectively provided on the main slider 40 and the sub-slider 50. The main slider 40 and the sub-slider 50 are disposed on the side of the spindle motor 31. The main slider 40 is disposed such that its one end comes on the side of a front surface of the chassis body 10 and its other end comes on the side of a rear surface of the chassis body 10. The sub-slider 50 is disposed between the traverse base 30 and the rear base 13 in a direction perpendicular to the main slider 40.

The cam mechanisms which displace the traverse base 30 comprise a first cam mechanism 41 and a second cam mechanism 51. The first cam mechanism 41 is provided on a surface of the main slider 40 on the side of the spindle motor 31, and the second cam mechanism 51 is provided on the sub-slider 50 on the side of the spindle motor 31.

A base member 15 is provided between the main slider 40 and the traverse base 30. A base member 16 is provided between the sub-slider 50 and the traverse base 30. The base member 15 and the base member 16 are fixed to the base body 10. A position of a cam pin of the traverse base 30 is limited by a vertical groove formed in the base member 15, and a position of the cam pin of the traverse base 30 is limited by a vertical groove formed in the base member 16.

The base member 16 and the sub-slider 50 are connected to each other through a third cam mechanism (not shown). The third cam mechanism has a function for moving the sub-slider 50 away from the base body 10 when the traverse base 30 is moved away from the base body 10 by the second cam mechanism 51.

A loading motor 60 is disposed on the side of one end of the main slider 40. A drive shaft of the loading motor 60 and the one end of the main slider 40 are connected to each other through a gear mechanism.

By driving the loading motor 60, the main slider 40 can slide in the longitudinal direction. The main slider 40 is connected to the sub-slider 50 by a cam lever 70.

The cam lever 70 includes a turning fulcrum 71, a pin 72, a pin 73 and a pin 74. The pins 72 and 73 engage with a cam groove formed in an upper surface of the main slider 40, the pin 74 engages with a cam groove formed in an upper surface of the sub-slider 50, and the cam lever 70 turns around a turning fulcrum 71 as an axis.

The above-explained connector 12, traverse base 30, rear base 13, printed board 14, insulators 34A and 34B, main slider 40, sub-slider 50 and loading motor 60 are provided on the deep bottom 10A of the base body 10, and form a disk inserting space between these members and the lid.

Next, a guide member for supporting a disk when the disk is to be inserted, and a lever member which operates when a disk is inserted will be explained below.

A first disk guide 17 having a predetermined length is provided on the side of one end of the deep bottom 10A near the disk-insertion opening 11. The first disk guide 17 has a groove having a U-shaped cross section as viewed from the disk inserting side. A disk is supported by this groove.

A pull-in lever 80 is provided on the shallow bottom 10B on the side of the disk-insertion opening 11. A second disk guide 81 is provided on a movable side end of the pull-in lever 80. The second disk guide 81 comprises a cylindrical roller, and is turnably provided on the movable end of the pull-in lever 80. A groove is formed in a roller outer periphery of the second disk guide 81, and a disk is supported by this groove.

The movable end of the pull-in lever 80 is operated closer to the disk-insertion opening 11 than the stationary side. The pull-in lever 80 has a turning fulcrum on the stationary end.

The pull-in lever 80 is operated by a sub-lever 90.

The sub-lever 90 has a projection on the movable side one end, and a turning fulcrum 92 on the other end. The projection of the sub-lever 90 slides in a long groove in the pull-in lever 80. The turning fulcrum 92 of the sub-lever 90 is located on the main slider 40. The turning fulcrum 92 is not operated in association with the main slider 40, and is fixed to the base 10. A pin 93 is provided on a lower surface of the sub-lever 90 at a location closer to the projection than the turning fulcrum 92. The pin 93 slides in the cam groove formed in an upper surface of the main slider 40. Therefore, the angle of the sub-lever 90 is changed as the main slider 40 moves, and if the angle of the sub-lever 90 is changed, the turning angle of the pull-in lever 80 is changed. That is, the second disk guide 81 of the pull-in lever 80 moves toward and away from the spindle motor 31 by the operation of the sub-lever 90.

A discharge lever 100 is provided on a side of the base body 10 opposite from the pull-in lever 80. A guide 101 is provided on a movable-side end on the side of one side of the discharge lever 100. The guide 101 holds an outer periphery of an inserted disk. The discharge lever 100 is provided at its other end with a turning fulcrum 102. The turning fulcrum 102 is provided on the deep bottom 10A of the base body 10. The one end of the discharge lever 100 is disposed on a surface of the traverse base cover 30A on the side of the lid. An abutment portion 103 is provided on the movable-side end of the discharge lever 100 closer to its rear surface than the guide 101. The discharge lever 100 is provided with an elastic body 104. One end of the elastic body 104 is fixed to a spring-engaging portion 104A of the discharge lever 100, and the other end is fixed to a projection 104B of the base body 10. The spring-engaging portion 104A is constituted by bending a portion of the discharge lever 100 toward the traverse base cover 30A. Portions of the spring-engaging portion 104A and the elastic body 104 are disposed in the opening 30B. The spring-engaging portion 104A and the elastic body 104 are moved by the motion of the discharge lever 100, but they are located in the opening 30B and do not come into contact with the traverse base cover 30A. By moving the spring-engaging portion 104A and the elastic body 104 in the opening 30B in this manner, the discharge lever 100 and the traverse base cover 30A can approach each other. Thus, an inserted disk does not crawl in between the traverse base cover 30A and the discharge lever 100. When the abutment portion 103 is pulled toward the rear surface by the elastic body 104, the abutment portion 103 abuts against an abutment portion 13A of the rear base 13. The discharge lever 100 is pulled out toward the disk-insertion opening 11 by an elastic force of the elastic body 104.

An eject lever guide roller 100A is provided on the movable-side end of the discharge lever 100. The eject lever guide roller 100A is disposed closer to the spindle motor 31 than the guide 101. The eject lever guide roller 100A is mounted on the discharge lever 100 through an eject guide holder 100B. The eject lever guide roller 100A is mounted on the eject guide holder 100B by an eject guide shaft 100C so that the eject lever guide roller 100A can turn by the contact with a surface of the disk rubber 31C when the eject lever guide roller 100A passes above the disk rubber 31C.

The height of the disk guide surface by the guide 101 is set higher than the center hub 31A in a state where the eject lever guide roller 100A is located on the disk rubber 31C. By setting the height of the guide 101 by the eject lever guide roller 100A and the disk rubber 31C in this manner, it is possible to prevent a disk from abutting against the center hub 31A located higher than the turntable. Since the eject lever guide roller 100A turns on the disk rubber 31C, the disk rubber 31C is not damaged. Since the position of the discharge lever 100 is determined by the disk rubber 31C in the spindle motor 31, a gap between the center hub 31A and a disk can precisely be secured.

The discharge lever 100 is associated with motion of the main slider 40 through the link arm 105 and the discharge slider 106. Here, the link arm 105 is turnably provided on the rear base 13, one end of the link arm 105 is connected to the main slider 40 through a pin 105B, and the other end is connected to the discharge slider 106 by a pin 105C. The discharge lever 100 is engaged with a cam groove of the discharge slider 106 by a cam pin.

A guide lever 180 is provided on a side of the base body 10 on the same side as the discharge lever 100. A side of the guide lever 180 on the rear surface side is a turning fulcrum 181, and the guide lever 180 is provided at its movable side with a guide 182. The guide lever 180 is biased by the elastic body 183 such that a side of the guide 182 projects toward a disk. The guide lever 180 is in association with the main slider 40 through the link arm 105 and the discharge slider 106, and the side of the guide lever 180 closer to the guide 182 moves away from a disk in accordance with motion of the main slider 40.

The base body 10 is provided at its rear surface with a restriction lever 110. An end of the restriction lever 110 on the side of its rear surface is a turning fulcrum 111. The restriction lever 110 is provided at its movable-side end with a guide 112. A portion of the restriction lever 110 on the side of the guide 112 is always biased such as to project toward the front side by the elastic body. The restriction lever 110 operates a limit switch at a predetermined position. That is, if a disk is inserted to a predetermined position, the limit switch is turned OFF, and the loading motor 60 is driven. If the loading motor 60 is driven, the main slider 40 slides.

A front guider 21 is provided on a front side of the base body 10. The front guider 21 is disposed on the side of one end of the disk-insertion opening 11 and between the pull-in lever 80 and the disk-insertion opening 11. The front guider 21 is provided closer to the lid than the loading motor 60, the gear mechanism and the main slider 40 such as to cover portions of the loading motor 60, the gear mechanism and the main slider 40.

The operation of the cam lever will be explained below.

While the pin 73 is in engagement with the cam groove of the main slider 40, the cam lever 70 does not turn. This state is the standby state. This state continues for a while even after a disk is loaded, and the traverse base 30 is close to the base body 10.

The pin 73 comes out from the cam groove of the main slider 40 when the center of the disk comes above the spindle motor 31, and the cam lever 70 starts turning.

The first cam mechanism 41 provided on the main slider 40 moves in the same direction as the main slider 40. The main slider 40 has a groove in which the pin 72 of the cam lever 70 slides, the sub-slider 50 moves by turning the cam lever 70, and if the sub-slider 50 moves, the second cam mechanism 51 moves.

That is, if the main slider 40 moves, the first cam mechanism 41 moves by a predetermined distance, and if the cam lever 70 turns, the second cam mechanism 51 moves by a predetermined distance and the traverse base 30 is displaced.

When the chucking motion is completed, the turning motion of the cam lever 70 is completed.

Figure 4:
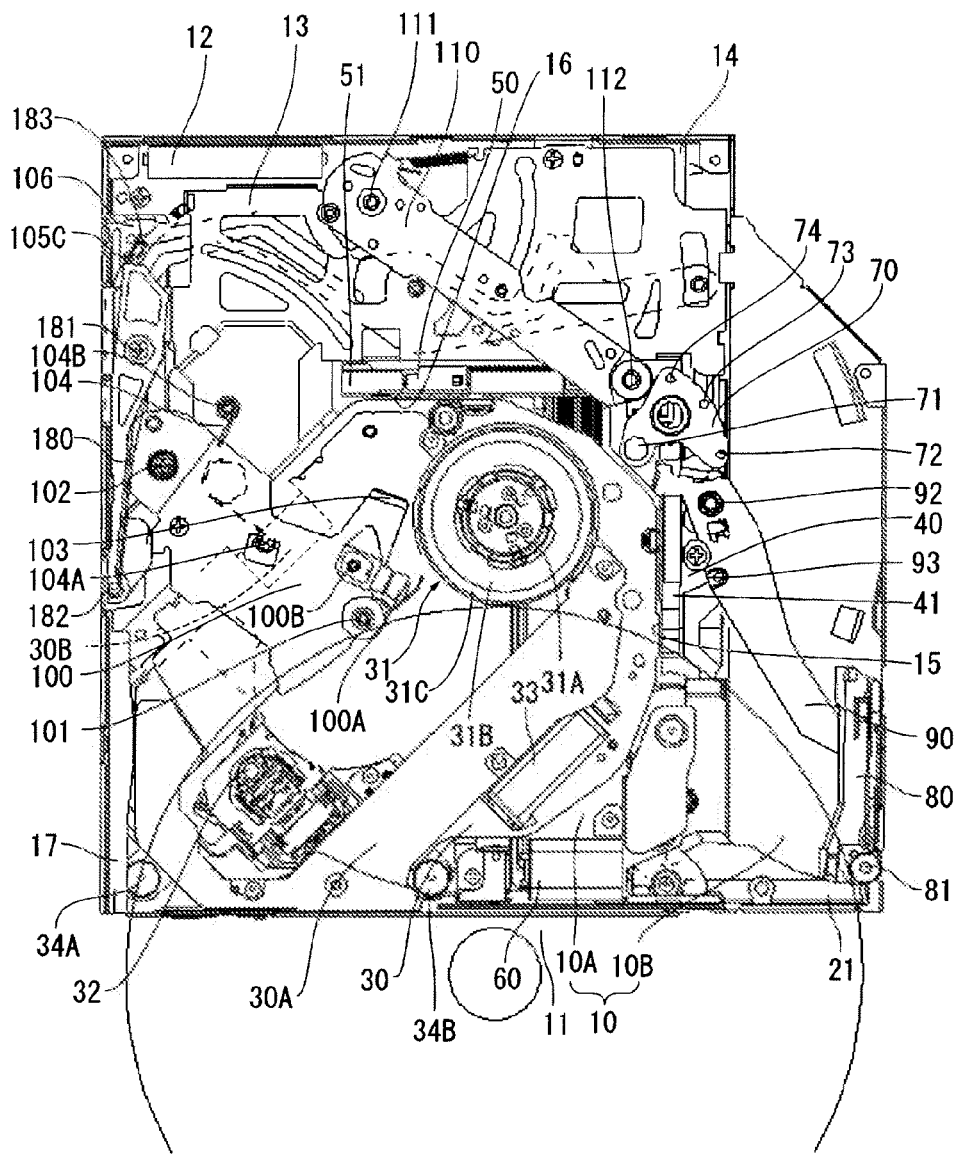
FIG. 4 is a plan view showing an operation state of the discharge lever which is caused when a disk is drawn into the disk apparatus.
Figure 5:
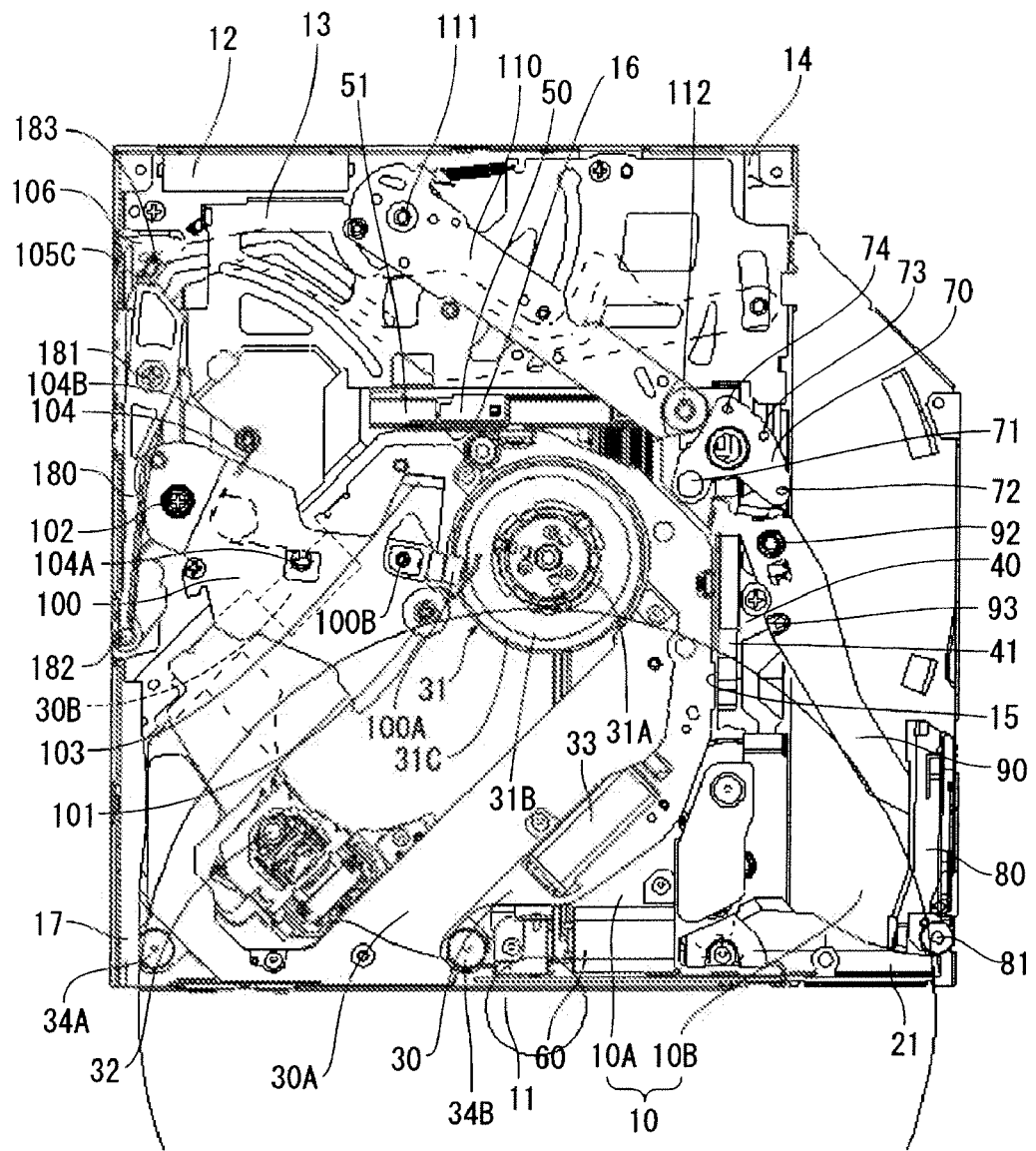
FIG. 5 is a plan view showing the operation state of the discharge lever which is caused when a disk is drawn into the disk apparatus.
Figure 6:
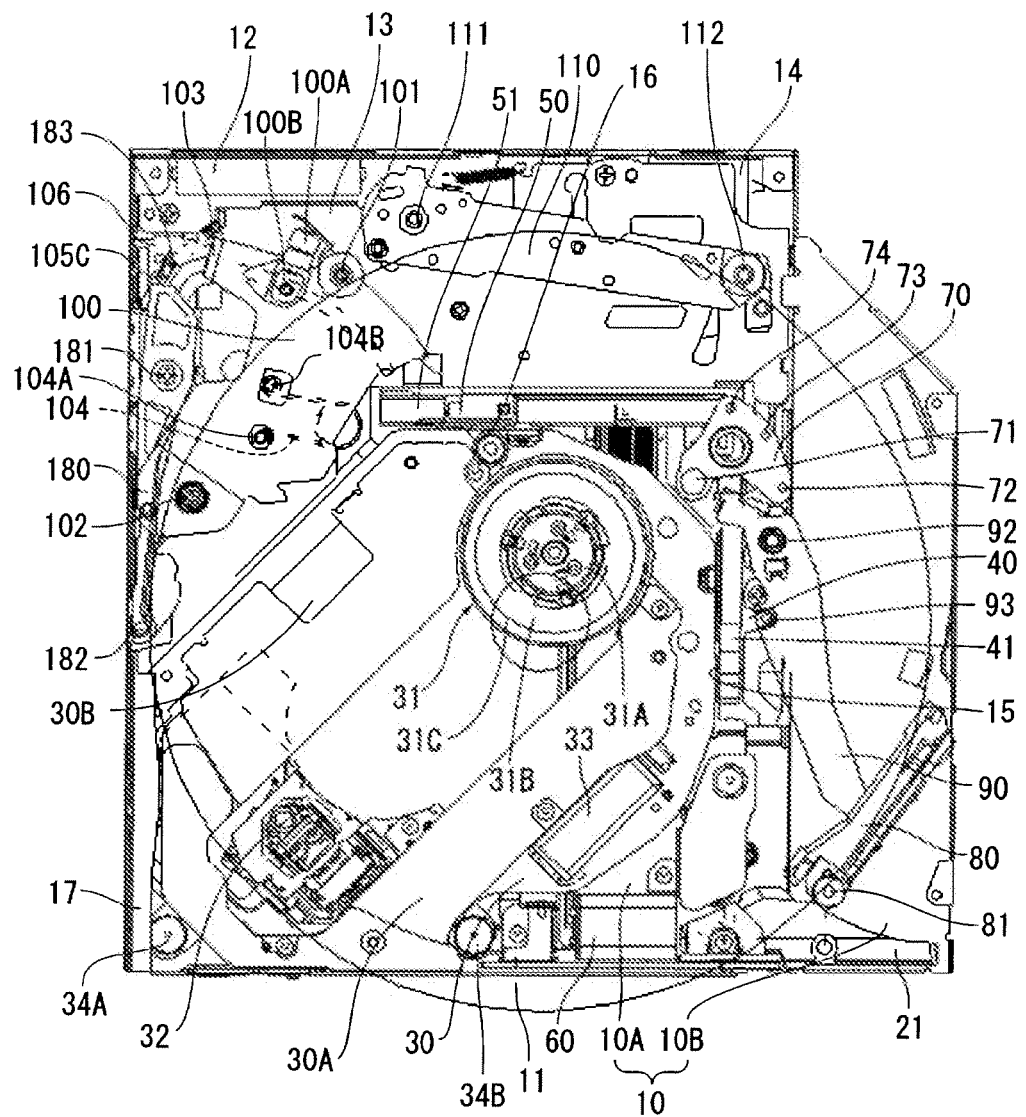
FIG. 6 is a plan view showing the operation state of the discharge lever which is caused when a disk is drawn into the disk apparatus.

FIGS. 4 to 6 are plan views showing an operation state of the discharge lever which is caused when a disk is drawn into the disk apparatus;

FIG. 4 shows a state where a disk is pushed in by a force from outside and the disk abuts against the guide 101.

If the disk is inserted, the disk is supported by the first disk guide 17 and the second disk guide 81. If the disk is inserted to a predetermined position, the disk is supported by the guide 101 as shown in FIG. 4.

FIG. 5 shows a state where the disk is further pushed in from the state shown in FIG. 4.

As shown in FIG. 5, if the disk is inserted, the discharge lever 100 starts turning around the turning fulcrum 102. If the discharge lever 100 approaches the spindle motor 31, the eject lever guide roller 100A rides on the surface of the disk rubber 31C as shown in the drawing. The eject lever guide roller 100A turns on the surface of the disk rubber 31C and passes through the surface of the disk rubber 31C.

In the state shown in FIG. 5, the disk approaches the center hub 31A and then passes above the center hub 31A, but since the height of the discharge lever 100 is set by the contact between the eject lever guide roller 100A and the disk rubber 31C, the disk does not come into contact with the center hub 31A.

FIG. 6 shows a state where the disk abuts against the restriction lever 110, the motor 60 starts driving, and the disk is pulled in by the pull-in lever 80. The insertion of the disk is detected, and the loading motor 60 is driven, thereby sliding the main slider 40 on the rear surface side.

According to the embodiment, the height of the discharge lever 100 with respect to the traverse base cover 30A is adjusted by the contact between the discharge lever 100 and the turntable 31. With this, the height of the discharge lever 100 can be set by the contact between the discharge lever 100 and the turntable 31. Thus, it is possible to precisely secure a gap from the center hub 31A with which a disk is most prone to come into contact.

As in this embodiment, the movable-side end of the discharge lever 100 is provided with the eject lever guide roller 100A and the height of the discharge lever 100 is set by the contact between the eject lever guide roller 100A and the surface of the disk rubber 31C. Thus, it is possible to precisely secure a gap between a disk and the center hub 31A.

According to the embodiment, since the eject lever guide roller 100A is turnably provided on the eject guide holder 100B by the eject guide shaft 100C and the eject lever guide roller 100A can turn, the probability that the turntable 31 is damaged is low.

According to the embodiment, since the eject lever guide roller 100A slides on the surface of the disk rubber 31C, the probability that the surface of the disk rubber 31C is damaged is low.

This application is based upon and claims the benefit of priority of Japanese Patent Application No. 2006-178 filed on Jan. 4, 2006, the contents of which are incorporated herein by reference in its entirety.

[Industrial Applicability]

In a disk apparatus for recording or replaying into or from a disk-like recording medium such as a CD and a DVD, the present invention can be utilized for a disk apparatus which is used as a domestic video device or a peripheral device, and which needs to be reduced in size.

The invention claimed is:

1. A slot-in type disk apparatus in which
a base body and a lid constitute a chassis sheath,
a disk-insertion opening into which a disk is directly inserted is formed in a front surface of the chassis sheath,
a traverse base is disposed on the side of a front surface of the base body,
a spindle motor held by the traverse base is disposed at a central portion of the base body,
the spindle motor is provided with a center hub to which a disk is attached and a turntable,
the traverse base is provided with a traverse base cover,
a portion of a discharge lever is configured to move on the traverse base cover, and
a movable-side end of the discharge lever is provided with a guide which holds a disk, wherein
a height of the discharge lever with respect to the traverse base cover is set by contact between the discharge lever and the turntable.

2. The slot-in type disk apparatus according to claim 1, wherein an eject lever guide roller is provided on the movable-side end of the discharge lever, and the eject lever guide roller slides on a surface of the turntable.

3. The slot-in type disk apparatus according to claim 2, wherein the eject lever guide roller is turnably provided on an eject guide holder by an eject guide shaft.

4. The slot-in type disk apparatus according to claim 2, wherein a disk rubber is pasted on an upper surface of an outer periphery of the turntable, and the eject lever guide roller slides on a surface of the disk rubber.

* * * * *